(12) United States Patent
Ryu et al.

(10) Patent No.: US 11,670,452 B2
(45) Date of Patent: Jun. 6, 2023

(54) MULTILAYER ELECTRONIC COMPONENT

(71) Applicant: SAMSUNG ELECTRO-MECHANICS CO., LTD., Suwon-si (KR)

(72) Inventors: Chung Hyeon Ryu, Suwon-si (KR); Gi Sub Lee, Suwon-si (KR); Ah Young Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/403,161

(22) Filed: Aug. 16, 2021

(65) Prior Publication Data

US 2022/0148804 A1   May 12, 2022

(30) Foreign Application Priority Data

Nov. 11, 2020 (KR) .................. 10-2020-0149845

(51) Int. Cl.
| | | |
|---|---|---|
| *H01G 4/012* | (2006.01) | |
| *H01G 4/008* | (2006.01) | |
| *H01G 4/30* | (2006.01) | |
| *H01G 4/232* | (2006.01) | |
| *H01G 4/248* | (2006.01) | |

(52) U.S. Cl.
CPC .......... *H01G 4/012* (2013.01); *H01G 4/0085* (2013.01); *H01G 4/30* (2013.01); *H01G 4/232* (2013.01); *H01G 4/248* (2013.01)

(58) Field of Classification Search
CPC ........ H01G 4/012; H01G 4/0085; H01G 4/30; H01G 4/232; H01G 4/248
See application file for complete search history.

(56) References Cited

U.S. PATENT DOCUMENTS

| | | | | |
|---|---|---|---|---|
| 2006/0266402 | A1* | 11/2006 | Zhang | H01M 8/12 136/205 |
| 2011/0255214 | A1* | 10/2011 | Gruner | H01G 11/46 977/948 |
| 2012/0327558 | A1* | 12/2012 | Jeong | B82Y 30/00 977/788 |
| 2014/0183478 | A1* | 7/2014 | Lee | H10K 50/8426 257/40 |
| 2014/0332731 | A1* | 11/2014 | Ma | C09D 7/70 252/506 |
| 2015/0187500 | A1* | 7/2015 | Kang | H01G 4/30 427/79 |

(Continued)

FOREIGN PATENT DOCUMENTS

JP      2009-170848 A    7/2009
KR  10-2019-0121227 A   10/2019

*Primary Examiner* — Michael P McFadden
(74) *Attorney, Agent, or Firm* — Morgan, Lewis & Bockius LLP

(57) ABSTRACT

A multilayer electronic component includes: a body including dielectric layers and internal electrodes alternately stacked with one of the dielectric layers interposed therebetween; and external electrodes disposed on external surfaces of the body and connected to the internal electrodes. One of the internal electrodes includes a plurality of conductive particles and conductive nanowires each of which having a shape different from a shape of the plurality of conductive particles and being connected to at least one of the plurality of conductive particles.

22 Claims, 5 Drawing Sheets

(56) References Cited

U.S. PATENT DOCUMENTS

2017/0011850 A1\* 1/2017 Kim .................... H01G 4/1227
2017/0012282 A1\* 1/2017 Kondo .............. H01M 10/0525
2018/0224391 A1\* 8/2018 Choa ................... G01N 27/127
2019/0027309 A1\* 1/2019 Lee ........................ H01G 4/005
2020/0181028 A1   6/2020 Wang et al.

\* cited by examiner

MULTILAYER ELECTRONIC COMPONENT

CROSS-REFERENCE TO RELATED APPLICATION(S)

This application claims benefit of priority to Korean Patent Application No. 10-2020-0149845 filed on Nov. 11, 2020 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor, a multilayer capacitor component, is a chip-type capacitor mounted on a printed circuit boards of various electronic products such as an image display device, for example, a liquid crystal display (LCD) or a plasma display panel (PDP), a computer, a smartphone, and a cellular phone, to serve to charge or discharge electricity therein or therefrom.

The multilayer ceramic capacitor may be used as a component of various electronic devices since it has a small size, implements a high capacitance, and may be easily mounted. In particular, as various electronic devices such as a computer and a mobile device have a small size and high capacity, demand for miniaturization and high capacitance of the multilayer ceramic capacitor has been further increased.

In order to implement the multilayer ceramic capacitor having a high capacitance as described above, dielectrics and internal electrodes having a reduced thickness and a multilayer structure have been actively developed. However, in the multilayer ceramic capacitor according to the related art, the internal electrode is easily broken, and connection strength between the internal electrode and an external electrode is weak. Therefore, a technology for an internal electrode paste capable of forming a thin internal electrode and ensuring strong connection strength between the internal electrode and the external electrode has been demanded.

In addition, recently, with the increasing interest in vehicle electrical components in the industry, multilayer ceramic capacitors have also been required to have a high reliability and high strength. Therefore, the internal electrode used in the multilayer ceramic capacitor has also been required to have a higher warpage strength against an external physical impact.

SUMMARY

An aspect of the present disclosure may provide a multilayer electronic component in which an internal electrode is not easily broken and connection strength between the internal electrode and an external electrode is increased.

According to an aspect of the present disclosure, a multilayer electronic component may include: a body including dielectric layers and internal electrodes alternately stacked with one of the dielectric layers interposed therebetween; and external electrodes disposed on external surfaces of the body and connected to the internal electrodes. One of the internal electrodes may include a plurality of conductive particles and conductive nanowires each of which having a shape different from a shape of the plurality of conductive particles and being connected to at least one of the plurality of conductive particles.

According to an aspect of the present disclosure, a multilayer electronic component may include: a body including dielectric layers and internal electrodes alternately stacked with one of the dielectric layers interposed therebetween; and external electrodes disposed on external surfaces of the body and connected to the internal electrodes. One of the internal electrodes may include a conductive nanowire and a plurality of conductive particles connected to the conductive nanowire.

According to an aspect of the present disclosure, a multilayer electronic component may include: a body including dielectric layers and internal electrodes alternately stacked with one of the dielectric layers interposed therebetween; and external electrodes disposed on external surfaces of the body and connected to the internal electrodes. One of the internal electrodes may include one or more conductive particles and a conductive nanowire connecting the one or more conductive particles to one of the external electrodes.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
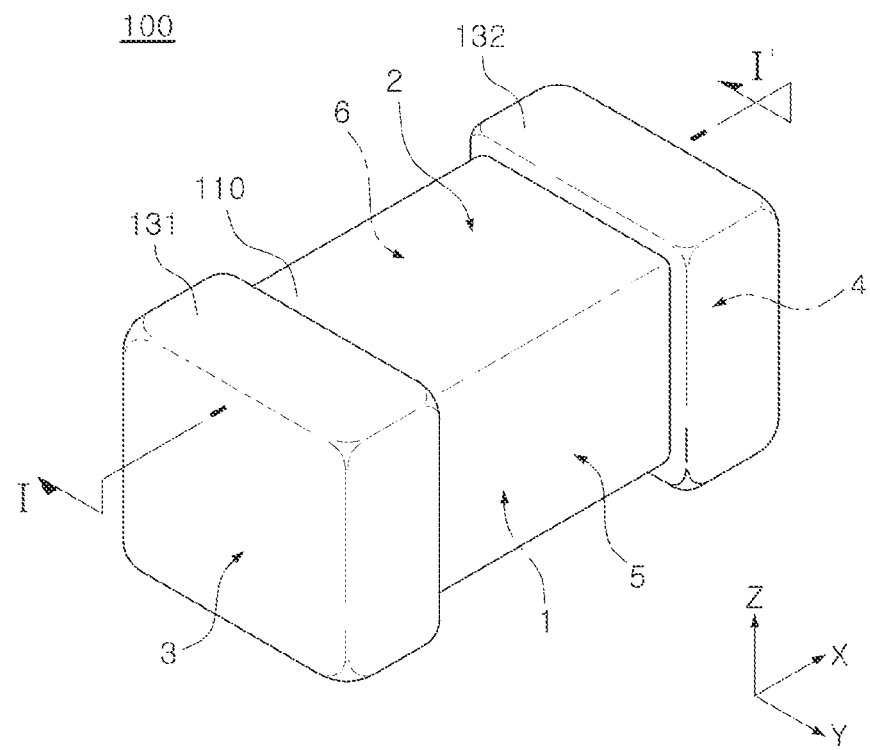
FIG. 1 is a perspective view schematically illustrating a multilayer electronic component according to an exemplary embodiment in the present disclosure.

Hereinafter, exemplary embodiments in the present disclosure will now be described in detail with reference to the accompanying drawings.

Directions will be defined in order to clearly describe exemplary embodiments in the present disclosure. X, Y and Z in the drawings refer to a length direction, a width direction, and a thickness direction of a multilayer electronic component, respectively.

In the present specification, the length direction may refer to an X direction or a first direction, the width direction may refer to a Y direction or a second direction, and the thickness direction may refer to a Z direction, a third direction, or a stacking direction.

Multilayer Electronic Component

Figure 2:
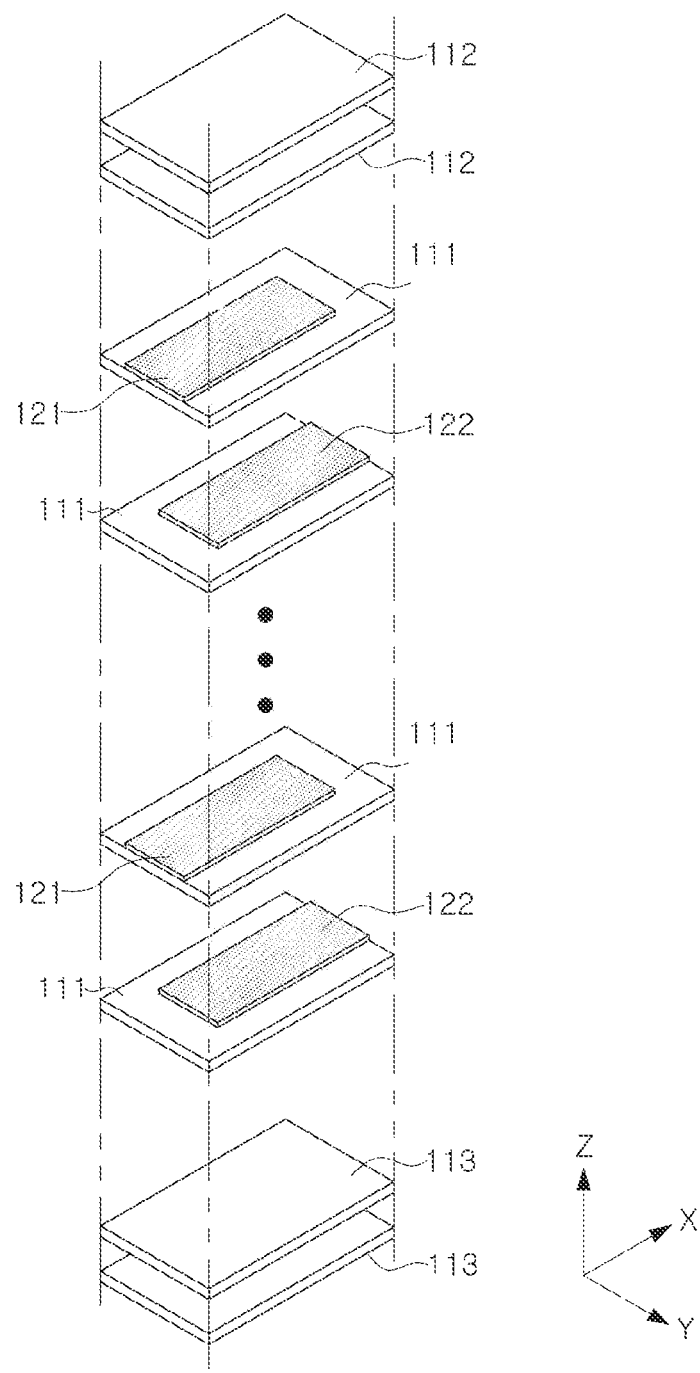
FIG. 2 is an exploded perspective view of a body in which dielectric layers and internal electrodes are stacked according to an exemplary embodiment in the present disclosure.
Figure 3:
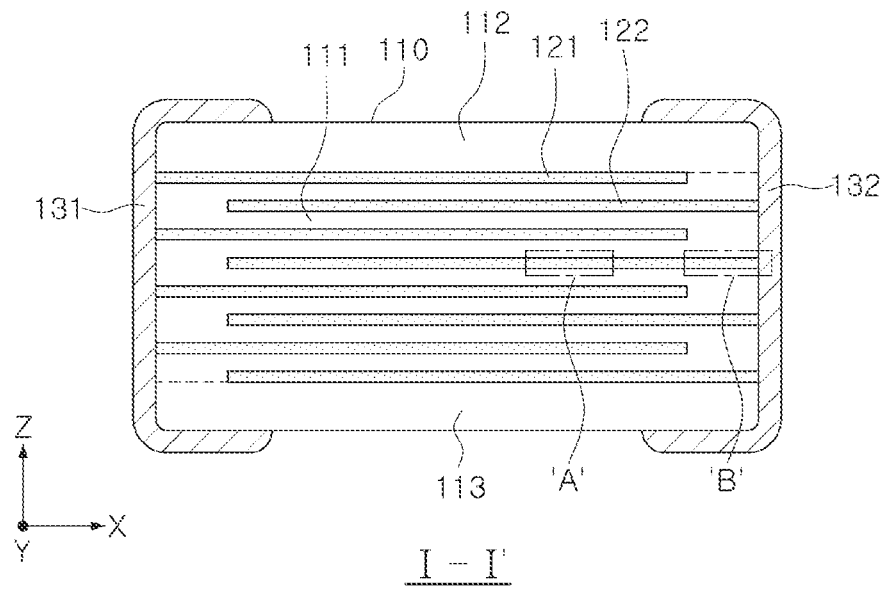
FIG. 3 is a cross-sectional view taken along line I-I' of FIG. 1.
Figure 4:
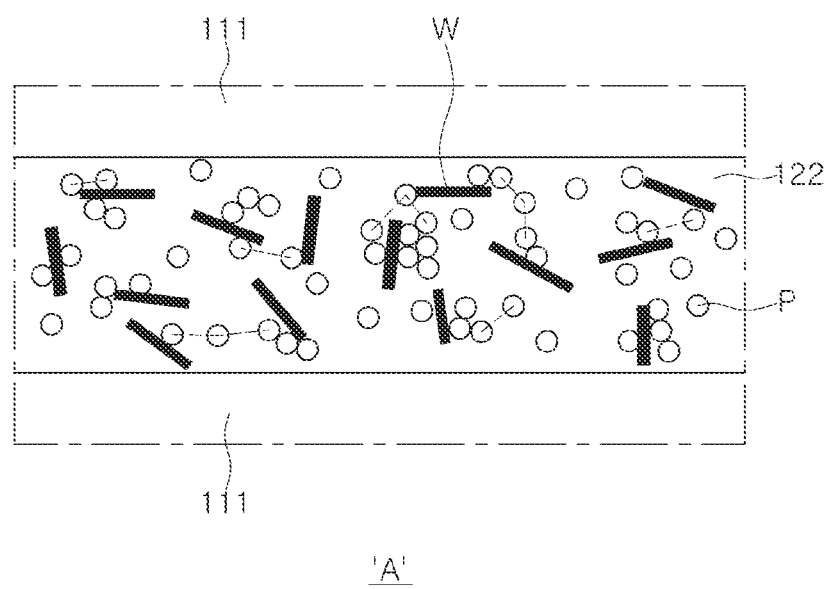
FIG. 4 is a schematic enlarged view of a region "A" of FIG. 3.
Figure 5:
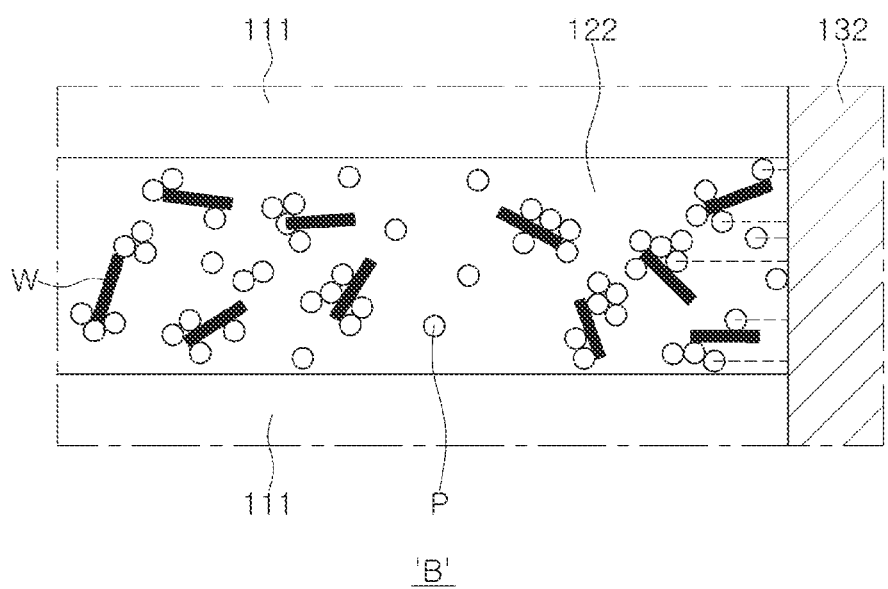
FIG. 5 is a schematic enlarged view of a region "B" of FIG. 3.

FIG. 1 is a perspective view schematically illustrating a multilayer electronic component according to an exemplary embodiment in the present disclosure, FIG. 2 is an exploded perspective view of a body in which dielectric layers and internal electrodes are stacked according to an exemplary embodiment in the present disclosure, FIG. 3 is a cross-sectional view taken along line I-I' of FIG. 1, FIG. 4 is a schematic enlarged view of a region "A" of FIG. 3, and FIG. 5 is a schematic enlarged view of a region "B" of FIG. 3.

Hereinafter, the multilayer electronic component according to an exemplary embodiment in the present disclosure will be described with reference to FIGS. 1 through 5.

A multilayer electronic component 100 according to an exemplary embodiment in the present disclosure includes a body 110 including dielectric layers 111 and internal electrodes 121 and 122, and external electrodes 131 and 132 disposed externally on the body 110 and connected to the internal electrodes 121 and 122, respectively, and the internal electrodes 121 and 122 include conductive particles P and conductive nanowires W.

The body 110 includes a plurality of dielectric layers 111 and a plurality of internal electrodes 121 and 122 alternately disposed with each of the dielectric layers 111 interposed therebetween.

A shape of the body 110 is not particularly limited, but may be a hexahedral shape or a shape similar to the hexahedral shape, as illustrated in FIG. 1. Although the body 110 does not have a hexahedral shape having perfectly straight lines due to shrinkage of ceramic powder included in the body 110 in a sintering process, the body 110 may have a substantially hexahedral shape.

The body 110 may have first and second surfaces 1 and 2 opposing each other in the thickness direction (Z direction), third and fourth surfaces 3 and 4 connected to the first and second surfaces 1 and 2 and opposing each other in the length direction (X direction), and fifth and sixth surfaces 5 and 6 connected to the first and second surfaces 1 and 2, connected to the third and fourth surfaces 3 and 4, and opposing each other in the width direction (Y direction).

The plurality of dielectric layers 111 forming the body 110 may be in a sintered state, and adjacent dielectric layers 111 may be integrated with each other so that boundaries therebetween are not readily apparent without using a scanning electron microscope (SEM).

A raw material of the dielectric layer 111 is not particularly limited as long as sufficient capacitance may be obtained. For example, the raw material of the dielectric layer 111 may be a barium titanate-based material, a lead composite perovskite-based material, a strontium titanate-based material, or the like.

Further, a material of the dielectric layer 111 may be prepared by adding various ceramic additives, organic solvents, plasticizers, binders, dispersing agents, and the like, to powder such as barium titanate (BaTiO$_3$) powder according to an object of the present disclosure.

The body 110 may include: a capacitance forming portion disposed in the body 110 and including the first and second internal electrodes 121 and 122 disposed so as to face each other with each of the dielectric layers 111 interposed therebetween; and cover portions 112 and 113 formed on and under the capacitance forming portion.

The capacitance forming portion, which contributes to forming the capacitance of the multilayer electronic component 100, may be formed by repeatedly stacking a plurality of first and second internal electrodes 121 and 122 with each of the dielectric layers 111 interposed therebetween.

The upper and lower cover portions 112 and 113 do not include the internal electrodes, may be formed of the same material as that of the dielectric layers 111, and may basically serve to prevent damage to the internal electrodes due to physical or chemical stress. Referring to FIG. 2, the upper cover portion 112 may be formed by stacking a single dielectric layer or two or more dielectric layers on an upper surface of the capacitance forming portion in a vertical direction, and the lower cover portion 113 may be formed by stacking a single dielectric layer or two or more dielectric layers on a lower surface of the capacitance forming portion in the vertical direction.

The internal electrodes 121 and 122 may include the first internal electrodes 121 and the second internal electrodes 122 disposed to face each other with each of the dielectric layers 111 interposed therebetween.

Referring to FIG. 2, the body 110 may be formed by alternately stacking a dielectric layer 111 on which the first internal electrode 121 is printed, and a dielectric layer 111 on which the second internal electrode 122 is printed, in the thickness direction (Z direction), and then sintering the stacked dielectric layers 111.

The first and second internal electrodes 121 and 122 may be electrically insulated from each other by each of the dielectric layers 111 disposed therebetween.

Referring to FIGS. 1 through 3, the first and second internal electrodes 121 and 122 may be exposed through the third and fourth surfaces 3 and 4 of the body 110, respectively. More specifically, the first internal electrode 121 is spaced apart from the fourth surface 4 and exposed through the third surface 3, and the second internal electrode 122 is spaced apart from the third surface 3 and exposed through the third surface 4.

The first external electrode 131 may be disposed on the third surface 3 of the body 110 and connected to the first internal electrodes 121, and the second external electrode 132 may be disposed on the fourth surface 4 of the body 110 and connected to the second internal electrodes 122.

Referring to FIG. 4, the internal electrodes 121 and 122 according to an exemplary embodiment in the present disclosure each include a plurality of conductive particles P and the conductive nanowires W each of which having a shape different from that of the plurality of conductive particles P and being connected to at least one of the plurality of conductive particles P.

The conductive particles P are included in the internal electrodes 121 and 122 to form a capacitance, and may serve to electrically connecting the internal electrodes 121 and 122 to the external electrodes 131 and 132, respectively.

The conductive particles P may include particles having various shapes. For example, the conductive particles P may have a spherical shape as illustrated in FIG. 4. The spherical conductive particles P as described above may grow by sticking around the conductive nanowire W in a process of sintering the internal electrodes 121 and 122.

However, this is only an example. The conductive particles P do not have to be spherical particles, but may be flake-shaped particles that are flat and long, or a mixture of spherical particles and flake-shaped particles. Further, the spherical conductive particles P may also include particles that are not completely spherical.

Even in this case, the shape of the conductive particles P does not include a fine thread shape such as the shape of the conductive nanowire W. A size of the conductive particle P may vary, and a diameter of the conductive particle P may be in a range of several nm to several µm. A diameter of the conductive nanowire W may be 1 µm less, and a length of the conductive nanowire W may be 10 µm or more.

The conductive particles P may contain a conductive metal. The conductive metal contained in the conductive particles P may be any metal that may have electric conductivity, for example, one or more selected from the group consisting of nickel (Ni), copper (Cu), and alloys thereof.

The conductive nanowire W may have a fine thread shape that is different from the shape of the conductive particles P, have a diameter of several nm, and have a length of several µm to several µm. In one example, a length of the conductive nanowire W may be greater than the diameter of the conductive particle P.

In a case in which the diameter of the conductive nanowire W is 1 µm or more, or the length of the conductive nanowire W is less than 1 µm, and thus, there is no large difference between the diameter and the length, a difference in shape between the conductive nanowire W and the conductive particles P may become insignificant. In this case, an increase of a warpage strength and electrical connection strength that may be achieved by including the conductive nanowire W may be inhibited.

The conductive nanowire W serves to reduce breaking of the internal electrodes 121 and 122 by increasing the electrical connection strength in the electrodes. At the same time, the conductive nanowire W may increase the electrical connection strength between the internal electrodes 121 and 122 and the external electrodes 131 and 132.

That is, the conductive nanowire W is included in each of the internal electrodes 121 and 122 and serves as a bridge, thereby alleviating electrical disconnection between the conductive particles P dispersively distributed in the internal electrodes 121 and 122.

In addition, the conductive nanowire W may absorb an external physical impact. That is, since the internal electrodes 121 and 122 including the conductive nanowires W have ductility higher than those that do not include the conductive nanowires W, the warpage strength of the multilayer electronic component 100 may be increased.

Particularly, the stronger electrical connection strength in the internal electrodes 121 and 122 that is achieved by adding the conductive nanowires W is based on agglomeration of the conductive particles P in the process of sintering the internal electrodes 121 and 122, and thus, a detailed description thereof will be provided below.

Figure 6A:
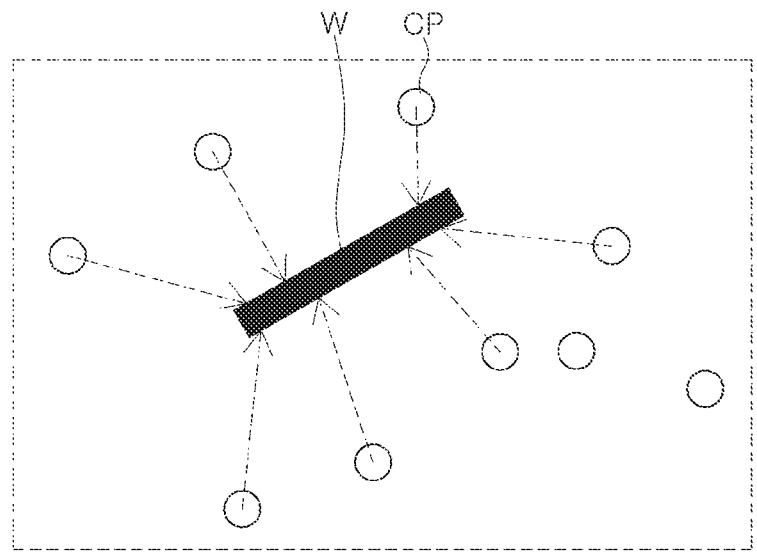
FIGS. 6A and 6B are schematic diagrams for describing a manner in which particle growth occurs around a conductive nanowire according to an exemplary embodiment in the present disclosure as the internal electrodes are sintered.
Figure 6B:
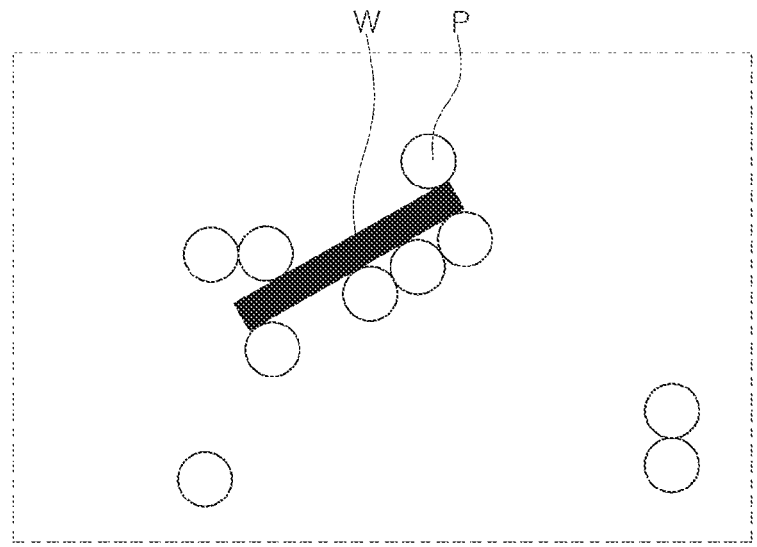

FIGS. 6A and 6B are schematic diagrams for describing a manner in which particle growth occurs around the conductive nanowire according to an exemplary embodiment in the present disclosure as the internal electrodes are sintered.

Referring to FIGS. 6A and 6B, the conductive nanowire W may connect adjacent particles among the plurality of conductive particles P. For example, as illustrated in FIG. 6A, the internal electrodes 121 and 122 may be sintered by adding conductive powder CP and the conductive nanowires W to a paste used to form the internal electrodes 121 and 122. Here, a sintering temperature may be set to be lower than a melting point (for example, approximately 1455° C. in a case of a nickel (Ni) nanowire) of the conductive nanowire W.

In this case, in the sintering process, the conductive nanowire W maintains its shape even after the sintering, but the conductive powder CP whose melting point is lower than that of the conductive nanowire W sticks around the conductive nanowire W. That is, as illustrated in FIG. 6B, the plurality of conductive particles P may grow around each conductive nanowire W.

In this case, the conductive nanowire W and the plurality of conductive particles P growing around the conductive nanowire W may form one sintered mass and maintain an electrically connected state. Further, the respective sintered masses may be adjacent to each other in a lateral direction and spaced apart from each other.

Therefore, among the plurality of conductive particles P, particles connected to different conductive nanowires W, respectively, may be adjacent to each other in the lateral direction and spaced apart from each other. That is, as indicated by dotted lines in FIG. 4, a short distance between the conductive particles P in the lateral direction may be maintained. However, it is not necessary that the particles connected to different conductive nanowires W, respectively, are spaced apart from each other, and it is a matter of course that a distance between the sintered masses may be decreased due to particle growth occurring in the sintering process, and the sintered masses may come into contact with each other.

As such, in a case in which the plurality of conductive particles P are adjacent to each other in the lateral direction by the conductive nanowires W, the electrical connection strength in the electrodes may be increased, such that the breaking of the internal electrodes 121 and 122 may be reduced.

Meanwhile, the conductive nanowire W may also connect the plurality of conductive particles P and the external electrodes 131 and 132 to each other.

For example, in the process of sintering the internal electrodes 121 and 122 as described above, the conductive powder CP also sticks around conductive nanowires W positioned adjacent to the external electrodes 131 and 132, the conductive powder CP being adjacent to the conductive nanowires W. That is, as illustrated in FIG. 5, the plurality of conductive particles P may grow around the respective conductive nanowires W at positions adjacent to the external electrodes 131 and 132.

In this case, the conductive nanowire W and the plurality of conductive particles P growing around the conductive nanowire W may form one sintered mass and maintain an electrically connected state. Further, the respective sintered masses may be adjacent to the external electrodes 131 and 132 and spaced apart from the external electrodes 131 and 132.

Therefore, among the plurality of conductive particles P, particles connected to the conductive nanowires W adjacent to the external electrodes 131 and 132 may be spaced apart from the external electrodes 131 and 132. That is, as indicated by dotted lines in FIG. 5, a short distance between the external electrode 132 and the conductive particles P included in the internal electrode 122 may be maintained.

However, it is not necessary that the particles connected to the conductive nanowires W are spaced apart from the external electrodes 131 and 132, and it is a matter of course that the conductive particles P may be formed in regions that are in contact with the external electrodes 131 and 132 due to particle growth occurring in the sintering process.

As such, in a case in which the plurality of conductive particles P are adjacent to the external electrodes 131 and 132 by the conductive nanowires W, the electrical connection strength between the internal electrode 121 and the external electrode 131, and between the internal electrode 122 and the external electrode 132 may be increased.

The conductive nanowire W may contain a conductive metal. Here, the conductive metal contained in the conductive nanowire W may be any metal that may have electric conductivity, for example, one or more selected from the group consisting of nickel (Ni), copper (Cu), and alloys thereof.

The conductive particles P and the conductive nanowires W may contain the same conductive metal. As an example, the conductive particles P and the conductive nanowires W may contain nickel (Ni) as a common main component. As another example, the conductive particles P and the conductive nanowires W may contain copper (Cu) as a common main component.

The conductive particles P and the conductive nanowires W may form a plurality of sintered masses containing nickel (Ni) or copper (Cu) as a main component at the time of sintering the internal electrodes 121 and 122.

A mass ratio of the conductive nanowires W with respect to the sum of masses of the conductive particles P and the conductive nanowires W included in the internal electrodes 121 and 122 may be 0.1 wt % or more and 5 wt % or less.

In a case in which the mass ratio of the conductive nanowires W is less than 0.1 wt %, there is a possibility that improvement of the warpage strength and electrical connection strength is insufficient. Therefore, the mass ratio of the conductive nanowires W included in the internal electrodes 121 and 122 with respect to the sum of the masses of the conductive particles P and the conductive nanowires W may be 0.1 wt % or more. More preferably, the mass ratio of the conductive nanowires W included in the internal electrodes 121 and 122 with respect to the sum of the masses of the conductive particles P and the conductive nanowires W may be 1 wt % or more.

Further, in a case in which the mass ratio of the conductive nanowires W exceeds 5 wt %, dispersibility of the paste forming the paste used to form the internal electrodes 121 and 122 may deteriorate, and thus, a further increase of the electrical connection strength may be difficult to achieve, and there is a possibility that a crack occurs in the body 110. Therefore, the mass ratio of the conductive nanowires W included in the internal electrodes 121 and 122 with respect to the sum of the masses of the conductive particles P and the conductive nanowires W may be 5 wt % or less.

The internal electrodes 121 and 122 may be formed by applying and then sintering a conductive paste containing the conductive powder CP and the conductive nanowires W.

However, the material of the conductive paste used to form the internal electrodes 121 and 122 is not limited thereto, and for example, the conductive paste may further contain a noble metal material such as palladium (Pd) or palladium-silver (Pd—Ag) alloy. Further, a glass frit may be further added to the conductive paste for the internal electrodes 121 and 122.

A method of printing the conductive paste may be a screen-printing method, a gravure printing method, or the like, but is not limited thereto.

The external electrodes 131 and 132 may be disposed on the body 110, and may be connected to the internal electrodes 121 and 122, respectively. As illustrated in FIG. 3, the external electrodes 131 and 132 may include first and second external electrodes 131 and 132 connected to the first and second internal electrodes 121 and 122, respectively.

The first and second external electrodes 131 and 132 may be electrically connected to the first and second internal electrodes 121 and 122, respectively, in order to form a capacitance, and the second external electrode 132 may be connected to a potential different to a potential to which the first external electrode 131 is connected.

The first external electrode 131 may include a connection portion disposed on the third surface 3 of the body 110, and a band portion extending from the connection portion to portions of the first and second surfaces 1 and 2. Similarly, the second external electrode 132 may include a connection portion disposed on the fourth surface 4 of the body 110, and a band portion extending from the connection portion to portions of the first and second surfaces 1 and 2. Here, the band portion may extend not only to the portions of the first and second surfaces 1 and 2, but also to portions of the fifth and sixth surfaces 5 and 6 from the connection portion.

Meanwhile, a structure in which the multilayer electronic component 100 includes two external electrodes 131 and 132 is described in the present exemplary embodiment, but the number, shapes, or the like, of the external electrodes 131 and 132 may be changed depending on shapes of the internal electrodes 121 and 122 or other purposes.

A material of the external electrodes 131 and 132 is not particularly limited. The external electrodes 131 and 132 may be formed of any material having electrical conductivity, such as a metal, and the specific material of each of the external electrodes 131 and 132 may be determined in consideration of electrical characteristics, structural stability, or the like. In addition, the external electrodes 131 and 132 may have a multilayer structure, if necessary.

The external electrodes 131 and 132 may each be a sintered electrode containing a conductive metal and glass, or a resin-based electrode containing a conductive metal and a resin. Further, the conductive metal contained in the external electrodes 131 and 132 may be a material having an excellent electrical conductivity, and is not particularly limited. For example, the conductive metal may be at least one of nickel (Ni), copper (Cu), or an alloy thereof.

Experimental Examples

TABLE 1

| Experimental Examples | Cu particles/(Cu particles + Cu nanowires) (wt %) | Cu nanowires/(Cu particles + Cu nanowires) (wt %) | Average Porosity (%) |
|---|---|---|---|
| 1* | 100 | 0 | 15.95 |
| 2 | 99 | 1 | 7.92 |
| 3 | 97 | 3 | 6.34 |
| 4 | 95 | 5 | 4.07 |
| 5* | 0 | 100 | 16.45 |

Table 1 shows average porosities measured by sintering electrodes including copper (Cu) conductive particles P and copper (Cu) conductive nanowires W at different mass ratios, respectively, and then photographing the electrodes by using the SEM. Here, the average porosity may be measured by observing, with an SEM, five internal electrodes positioned at the center of a sample chip in the X and Z directions in a cross section of the sample chip taken along the X and Z directions at the center of the sample chip in the W direction.

That is, Table 1 shows a specific example of the internal electrodes 121 and 122 according to an exemplary embodiment in the present disclosure, and shows results obtained by performing experiments on the effect of increasing the electrical connection strength by using the electrodes including the copper (Cu) conductive particles P and the copper (Cu) conductive nanowires W.

Experimental Examples 2 to 4 in Table 1 are examples in which the conductive particles P and the conductive nanowires W are included together as in the exemplary embodiment in the present disclosure, and Experimental Examples 1 and 5 (comparative examples) are added for comparison with the exemplary embodiment in the present disclosure.

First, Experimental Example 2 shows a result obtained by sintering an electrode including the copper (Cu) conductive particles P and the copper (Cu) conductive nanowires W at a mass ratio of 99:1 (wt %).

In this case, as illustrated in FIG. 4, the plurality of conductive particles P adjacent to the conductive nanowire W stick to the conductive nanowire W and grow. Further, as a result of analyzing the average porosity in Experimental Example 2, the measured average porosity was 7.92%.

Further, Experimental Example 3 shows a result obtained by sintering an electrode including the copper (Cu) conductive particles P and the copper (Cu) conductive nanowires W at a mass ratio of 97:3 (wt %).

Similarly to Experimental Example 2, the plurality of conductive particles P adjacent to the conductive nanowire W stick to the conductive nanowire W and grow. Further, as a result of analyzing the average porosity in Experimental Example 3, the measured average porosity was 6.34%.

Further, Experimental Example 4 shows a result obtained by sintering an electrode including the copper (Cu) conductive particles P and the copper (Cu) conductive nanowires W at a mass ratio of 95:5 (wt %).

Similarly to Experimental Example 2, the plurality of conductive particles P adjacent to the conductive nanowire W stick to the conductive nanowire W and grow. Further, as a result of analyzing the average porosity in Experimental Example 4, the measured average porosity was 4.07%.

Meanwhile, referring to comparative examples, Experimental Example 1 shows a result obtained by sintering an electrode including only the copper (Cu) conductive particles P at a mass ratio of 100 wt % without including the copper (Cu) conductive nanowires W.

As a result of analyzing the average porosity in Experimental Example 1, the measured average porosity was 15.95%.

In contrast, Experimental Example 5 shows a result obtained by sintering an electrode including only the copper (Cu) conductive nanowires W at a mass ratio of 100 wt % without including the copper (Cu) conductive particles P.

As a result of analyzing the average porosity in Experimental Example 5, the measured average porosity was 16.45%.

It may be appreciated that the average porosities of the electrodes in Experimental Examples 2 to 4 were remarkably lower than the average porosities in the comparative examples. In other words, it is interpreted that disconnection between the conductive particles P included in the electrode was reduced due to addition of the conductive nanowires W at a mass ratio of from 0.1 wt % to 5 wt %.

Further, in a case in which such a result is applied to the multilayer electronic component 100 according to the present disclosure, breaking of the internal electrodes 121 and 122 may be reduced, and the electrical connection strength between the internal electrode 121 and the external electrode 131, and between the internal electrode 122 and the external electrode 132 may be increased.

Therefore, according to such Experimental Examples, a mass ratio of the conductive nanowires W with respect to the sum of the masses of the conductive particles P and the conductive nanowires W included in the internal electrodes 121 and 122 may be 0.1 wt % or more and 5 wt % or less.

For reference, Table 1 shows the average porosities in Experimental Examples in which a content of metal with respect to a total mass of the electrode is approximately 80 wt %. Therefore, the average porosities shown in Table 1 are different from that of the internal electrodes 121 and 122 of the multilayer electronic component 100. That is, as compared with Experimental Examples of Table 1, a content of metal contained in the internal electrodes 121 and 122 is generally relatively low, approximately 40 to 50 wt %, and thus, the average porosity may be higher than those shown in Table 1.

In the multilayer electronic component 100 according to an exemplary embodiment of the present disclosure, the average porosity of the internal electrodes 121 and 122 may be 6% or more and 15% or less.

As described above, since the metal content of the internal electrodes 121 and 122 generally included in the multilayer electronic component 100 is relatively low, the average porosity does not reach 4.07% even in a case in which the conductive nanowires W are included at a mass ratio of 5 wt %.

Here, in a case in which the metal content of the internal electrodes 121 and 122 is increased to approximately 80 wt % in order to decrease the average porosity to less than 6%, dispersibility and an adhesion force of the internal electrodes may deteriorate due to a decrease in content of other compositions of the internal electrodes 121 and 122, such as glass and a binder.

Further, in a case in which the average porosity of the internal electrodes 121 and 122 exceeds 15%, there still are a lot of conductive particles P that are not connected to each other. Therefore, it is hard to consider that the connection strength in the electrodes is increased.

As a result, in a case in which the average porosity of the internal electrodes 121 and 122 is in a range of 6% or more and 15% or less, the electrical connection strength in the internal electrodes 121 and 122 may be increased, and at the same time, a negative effect such as deterioration in dispersibility and adhesion force does not appear.

As set forth above, according to the exemplary embodiment in the present disclosure, as a mixture of the conductive particles and the conductive nanowires is included in the paste used to form the internal electrodes, internal disconnection of the internal electrodes after sintering is reduced and the electrical connection strength between the internal electrode and the external electrode is increased.

In addition, according to the exemplary embodiment in the present disclosure, the multilayer electronic component including the internal electrodes that include the metal conductive nanowires and thus have an increased warpage strength may be provided.

While exemplary embodiments have been shown and described above, it will be apparent to those skilled in the art that modifications and variations could be made without departing from the scope of the present invention as defined by the appended claims.

What is claimed is:

1. A multilayer electronic component comprising:
  a body including dielectric layers and internal electrodes alternately stacked with one of the dielectric layers interposed therebetween; and
  external electrodes disposed on external surfaces of the body and connected to the internal electrodes,
  wherein one of the internal electrodes includes a plurality of conductive particles and conductive nanowires, the conductive nanowires having a shape different from a shape of the plurality of conductive particles and being connected to at least one of the plurality of conductive particles,
  the conductive nanowires comprise a conductive metal,
  a length of one of the conductive nanowires is 10 µm or more.

2. The multilayer electronic component of claim 1, wherein the conductive nanowire connects adjacent particles among the plurality of conductive particles.

3. The multilayer electronic component of claim 2, wherein, among the plurality of conductive particles, particles connected to different conductive nanowires, respectively, are adjacent to each other and spaced apart from each other.

4. The multilayer electronic component of claim 1, wherein one of the conductive nanowires connects one or more of the plurality of conductive particles to one of the external electrodes.

5. The multilayer electronic component of claim 4, wherein, among the plurality of conductive particles, the one or more particles connected to the one of the conductive nanowires are spaced apart from the one of the external electrodes.

6. The multilayer electronic component of claim 1, wherein one of the conductive nanowires contains one or more conductive metals selected from the group consisting of nickel (Ni), copper (Cu), and alloys thereof.

7. The multilayer electronic component of claim 1, wherein the conductive particles are spherical particles.

8. The multilayer electronic component of claim 1, wherein the conductive particles and the conductive nanowires contain the same conductive metal.

9. The multilayer electronic component of claim 1, wherein a mass ratio of the conductive nanowires with respect to a sum of masses of the conductive particles and the conductive nanowires included in the internal electrode is 0.1 wt % or more and 5 wt % or less.

10. The multilayer electronic component of claim 1, wherein an average porosity of the one of the internal electrodes is 6% or more and 15% or less.

11. The multilayer electronic component of claim 1, wherein two or more of the conductive nanowires are spaced apart from each other.

12. The multilayer electronic component of claim 1, wherein two or more of the plurality of conductive particles are spaced apart from each other.

13. A multilayer electronic component comprising:
a body including dielectric layers and internal electrodes alternately stacked with one of the dielectric layers interposed therebetween; and
external electrodes disposed on external surfaces of the body and connected to the internal electrodes,
wherein one of the internal electrodes includes a conductive nanowire and a plurality of conductive particles connected to the conductive nanowire, and
the conductive nanowire comprises a conductive metal and has a length of 10 μm or more.

14. The multilayer electronic component of claim 13, wherein a the length of the conductive nanowire is greater than a diameter of the plurality of conductive particles.

15. The multilayer electronic component of claim 13, wherein the conductive nanowire contains one or more conductive metals selected from the group consisting of nickel (Ni), copper (Cu), and alloys thereof.

16. The multilayer electronic component of claim 13, wherein the conductive nanowire and the plurality of conductive particles contain the same conductive metal.

17. The multilayer electronic component of claim 13, wherein an average porosity of the one of the internal electrodes is 6% or more and 15% or less.

18. A multilayer electronic component comprising:
a body including dielectric layers and internal electrodes alternately stacked with one of the dielectric layers interposed therebetween; and
external electrodes disposed on external surfaces of the body and connected to the internal electrodes,
wherein one of the internal electrodes includes one or more conductive particles and a conductive nanowire connecting the one or more conductive particles to one of the external electrodes, and
the conductive nanowire comprises a conductive metal and has a length of 10 μm or more.

19. The multilayer electronic component of claim 18, wherein the length of the conductive nanowire is greater than a diameter of the one or more conductive particles.

20. The multilayer electronic component of claim 18, wherein the conductive nanowire contains one or more conductive metals selected from the group consisting of nickel (Ni), copper (Cu), and alloys thereof.

21. The multilayer electronic component of claim 18, wherein the conductive nanowire and the one or more conductive particles contain the same conductive metal.

22. The multilayer electronic component of claim 18, wherein an average porosity of the one of the internal electrodes is 6% or more and 15% or less.

* * * * *